United States Patent
Kapoor

(10) Patent No.: US 7,948,989 B2
(45) Date of Patent: May 24, 2011

(54) METHODS AND SYSTEMS FOR ENHANCING LOCAL REPAIR IN ROBUST HEADER COMPRESSION

(75) Inventor: Rohit Kapoor, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 406 days.

(21) Appl. No.: 11/743,577

(22) Filed: May 2, 2007

(65) Prior Publication Data

US 2007/0258458 A1 Nov. 8, 2007

Related U.S. Application Data

(60) Provisional application No. 60/798,058, filed on May 4, 2006.

(51) Int. Cl.
*H04L 12/56* (2006.01)
(52) U.S. Cl. .................................................. 370/394
(58) Field of Classification Search .......... 370/252, 370/394; 709/247; 375/240.25
See application file for complete search history.

(56) References Cited

U.S. PATENT DOCUMENTS

| | | | |
|---|---|---|---|
| 6,754,231 B1 | 6/2004 | Jonsson et al. | |
| 6,882,637 B1 * | 4/2005 | Le et al. | 370/349 |
| 7,392,459 B2 | 6/2008 | Bernadac et al. | |
| 2003/0206534 A1 * | 11/2003 | Wu | 370/328 |
| 2006/0187846 A1 * | 8/2006 | Pelletier et al. | 370/252 |
| 2007/0041382 A1 * | 2/2007 | Vayanos et al. | 370/394 |

FOREIGN PATENT DOCUMENTS

| | | |
|---|---|---|
| EP | 1370019 A1 | 12/2003 |
| WO | 01028180 | 4/2001 |
| WO | WO0228017 | 4/2002 |
| WO | 2006063188 | 6/2006 |

OTHER PUBLICATIONS

Network Working Group, Request for Comments 3095, Jul. 2001, pp. 25-26 and 60-61.*
Carsten Bormann (Ed) et al: "Robust Header Compression (ROHC); draft-ietf-rohc-rtp-02.txt" IETF Standard-Working-Draft, Internet Engineering Task Force, IETF, CH, vol. rohc, No. 2, Sep. 18, 2000, XP015026696.
International Search Report—PCT/US07/068160, International Search Authority—European Patent Office—Feb. 22, 2008.
C. Boman, et al , "Robust Header Compression (RoHC): Framework and four profiles: RTP, UDP, ESP and uncompressed," Internet Engineering Task Force, (RFC) 3095, Jul. 2001, pp. 1-168.

* cited by examiner

*Primary Examiner* — Kwang B Yao
*Assistant Examiner* — Tung Q Tran
(74) *Attorney, Agent, or Firm* — Kristine U. Ekwueme

(57) ABSTRACT

Methods and systems to enhance local repair in robust header compression (RoHC) decompressors (110, 114), which may improve network transmission efficiency and quality. One method uses lower layer information to enhance local repair at the decompressor (110, 114). Another method uses a user datagram protocol (UDP) checksum to enhance local repair at the decompressor (110, 114).

27 Claims, 13 Drawing Sheets

METHODS AND SYSTEMS FOR ENHANCING LOCAL REPAIR IN ROBUST HEADER COMPRESSION

CLAIM OF PRIORITY UNDER 35 U.S.C. §119

The present Application for Patent claims priority to Provisional Application No. 60/798,058, entitled "METHODS AND SYSTEMS FOR ENHANCING LOCAL REPAIR IN ROBUST HEADER COMPRESSION," filed May 4, 2006, and assigned to the assignee hereof and hereby expressly incorporated by reference herein.

BACKGROUND

1. Field

The present application relates generally to wireless communications, and more specifically, to methods and systems that enhance local repair in robust header decompression.

2. Background

Internet protocol (IP) is a network protocol used in both wired and wireless networks. For some services and applications, such as voice over internet protocol (VoIP), interactive games, messages, etc., a payload of an IP packet may be almost the same size or even smaller than an IP header of the packet. There may be significant redundancy in header fields within the same packet header and especially between consecutive packets of a packet stream. Header compression (HC) is a process of compressing protocol headers of an IP packet at one end of a link, transmitting them to another end of the link, and decompressing them to their original state at the other end.

BRIEF DESCRIPTION OF THE DRAWINGS

The features, nature, and advantages of the present application will become more apparent from the detailed description below when taken in conjunction with the drawings.

DETAILED DESCRIPTION

Embodiments disclosed herein may be implemented in any wireless and/or wired communication system, such as cellular networks, public switched telephone networks (PSTNs), wireless Internet, satellite networks, wide area networks (WANs), wireless local area networks (WLANs), VoIP networks, IP-based multimedia systems, etc.

Figure 1:
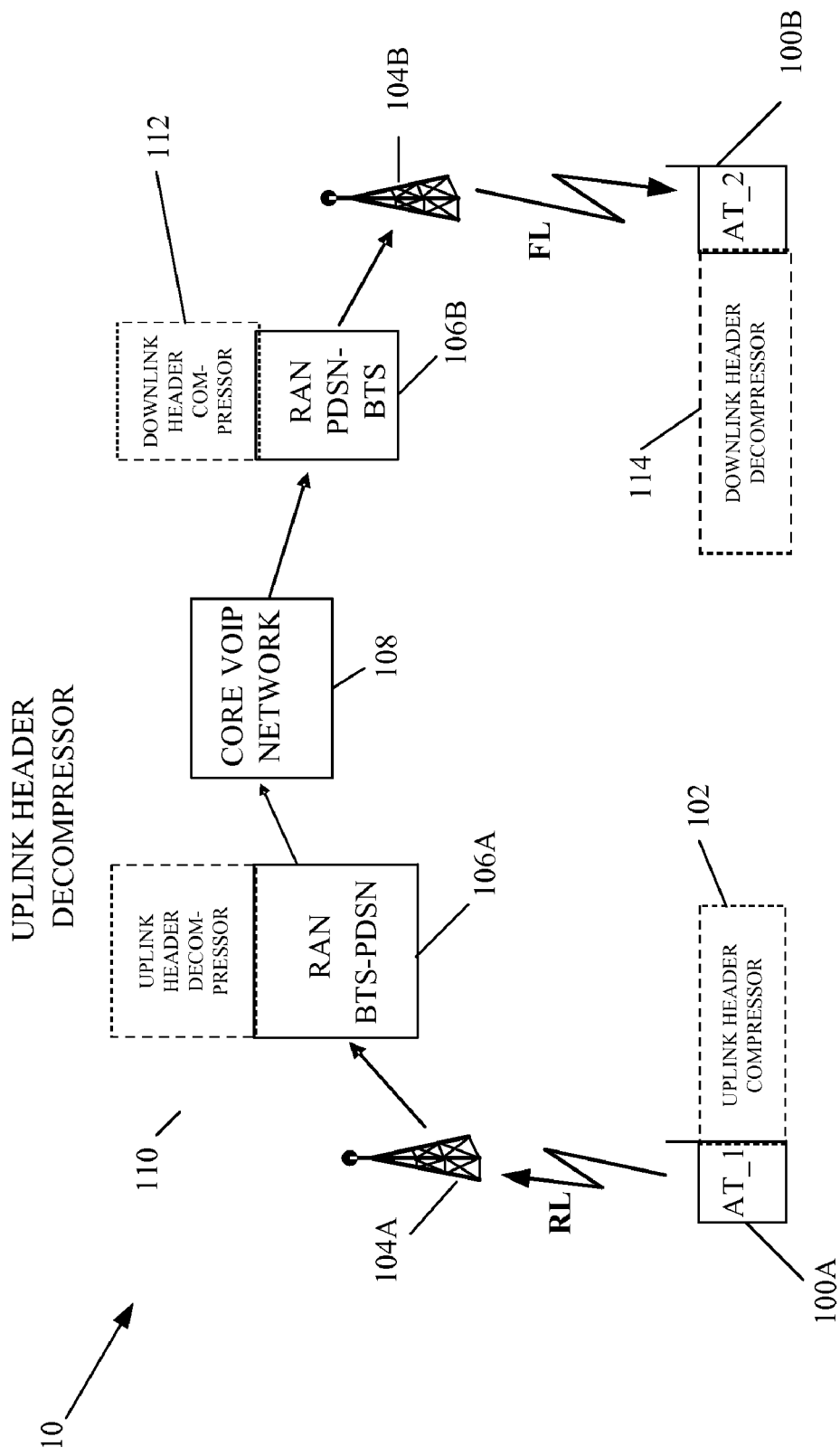
FIG. 1 illustrates a communication system in which one or more methods described herein may be implemented.

FIG. 1 illustrates an example of a communication system 10 in which one or more methods described herein may be implemented. A first access terminal (AT) 100A may include an uplink (or reverse link) header compressor 102. The first access terminal 100A may communicate wirelessly via a reverse link (RL) with a base station 104A and a base station transceiver system/packet data serving node (BTS-PDSN) 106A in a radio access network (RAN).

The BTS-PDSN 106A may include an uplink header decompressor 110, which may perform one or more methods described herein. The BTS-PDSN 106A may communicate with a packet data serving node/base station transceiver system (PDSN-BTS) 106B via a VoIP network 108. The PDSN-BTS 106B may include a downlink (or forward link) header compressor 112.

A second access terminal 100B may communicate wirelessly via a forward link (FL) with a base station 104B and the PDSN-BTS 106B. The second access terminal 100B may include a downlink header decompressor 114, which may perform one or more methods described herein. Instead of two wireless access terminals 100A, 100B, one of the access terminals may be a wired terminal.

The reverse link and forward link may use one or more communication protocols, such as code division multiple access (CDMA) 1x, CDMA 1x evolution data optimized (EV-DO) Rev. 0, Rev. A and Rev. B, wideband CDMA (WCDMA), high speed downlink packet access (HSDPA), high speed uplink packet access (HSUPA), time division synchronized CDMA (TD-SCDMA), global system for mobile communications (GSM), orthogonal frequency division multiplexing (OFDM), IEEE 802.11, IEEE 802.18, IEEE 802.20, Wimax, WiBro, ultra mobile wideband (UMB), and other communication technologies.

The access terminal (AT) described herein may refer to various types of devices, such as a wired phone, a wireless phone, a cellular phone, a lap top computer, a wireless communication personal computer (PC) card, a personal digital assistant (PDA), an external or internal modem, etc. An access terminal may be any data device that communicates through a wireless channel or through a wired channel, for example using fiber optic or coaxial cables. An access terminal may have various names, such as access unit, subscriber unit, mobile station, mobile device, mobile unit, mobile phone, mobile, remote station, remote terminal, remote unit, user device, user equipment, handheld device, etc. Access terminals may be mobile or stationary and may be dispersed throughout the communication system 10 of FIG. 1. Access terminals may communicate with one or more base station transceiver systems (BTSs), which may be called (or include) base stations, access networks, access points, Node Bs, and modem pool transceivers (MPTs).

Figure 2:
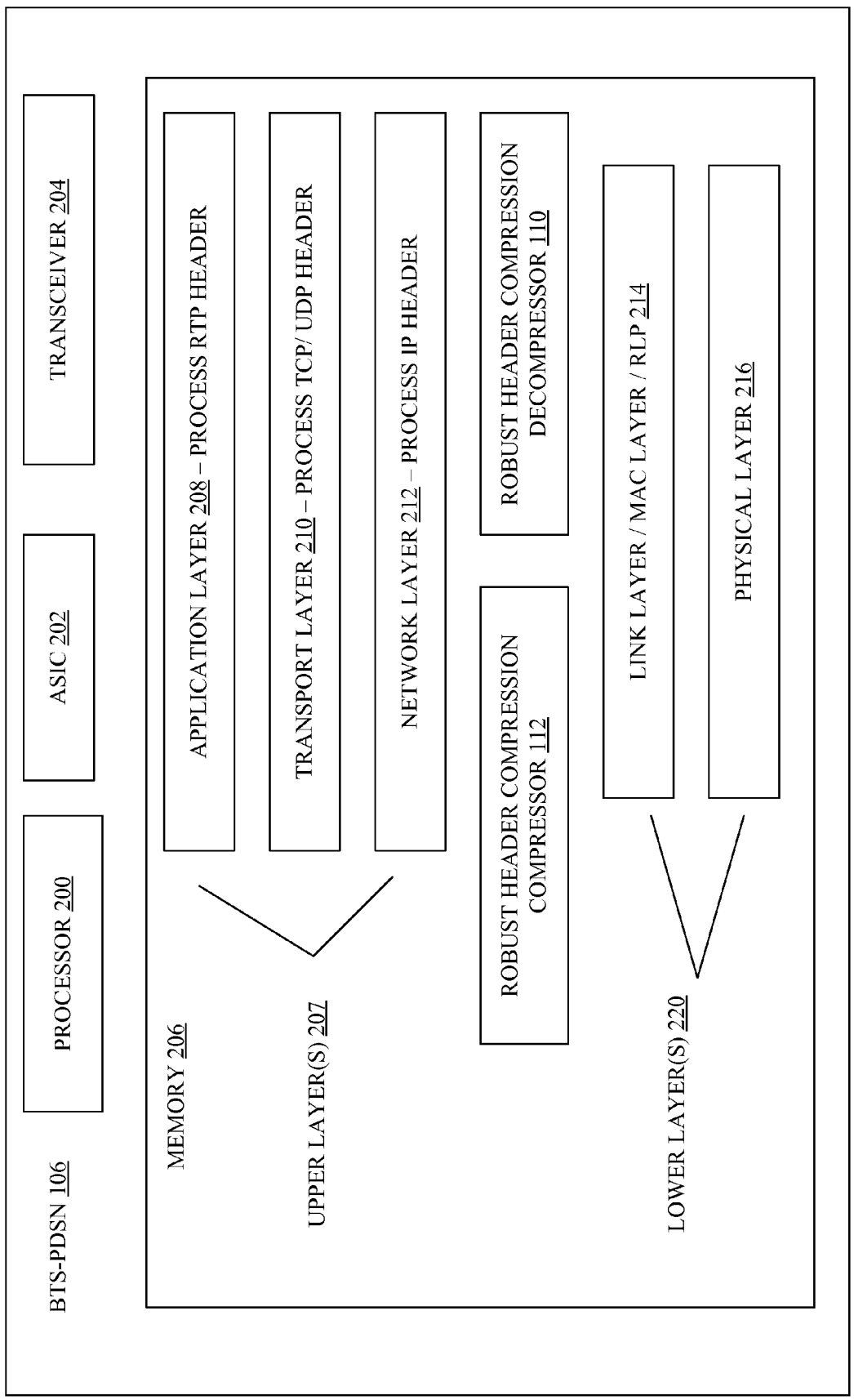
FIG. 2 illustrates some hardware and software components of a base station transceiver system/packet data serving node (BTS-PDSN) or PDSN-BTS of FIG. 1.

FIG. 2 illustrates some hardware and software components of the BTS-PDSN 106A and/or PDSN-BTS 106B of FIG. 1, such as a processor 200, an application specific integrated circuit (ASIC) and other hardware 202, a transceiver 204, and a memory 206. The memory 206 may store one or more upper layers 207, such as an application layer 208, a transport layer 210, and a network layer 212. The application layer 208 may process Real-time Transport Protocol (RTP or RTTP) headers. The transport layer 210 may process Transmission Control Protocol (TCP) and User Datagram Protocol (UDP) headers. The network layer 212 may process IP headers.

The memory 206 may also store a robust header compression compressor 112, a robust header compression decompressor 110 and one or more lower layers 220, such as a link layer and a medium access control (MAC) layer 214, which may include a radio link protocol (RLP) sublayer, and a physical layer 216. Note alternate embodiments may include some or all of these functions, modules, or layers, which may be implemented in alternate configurations.

Figure 3:
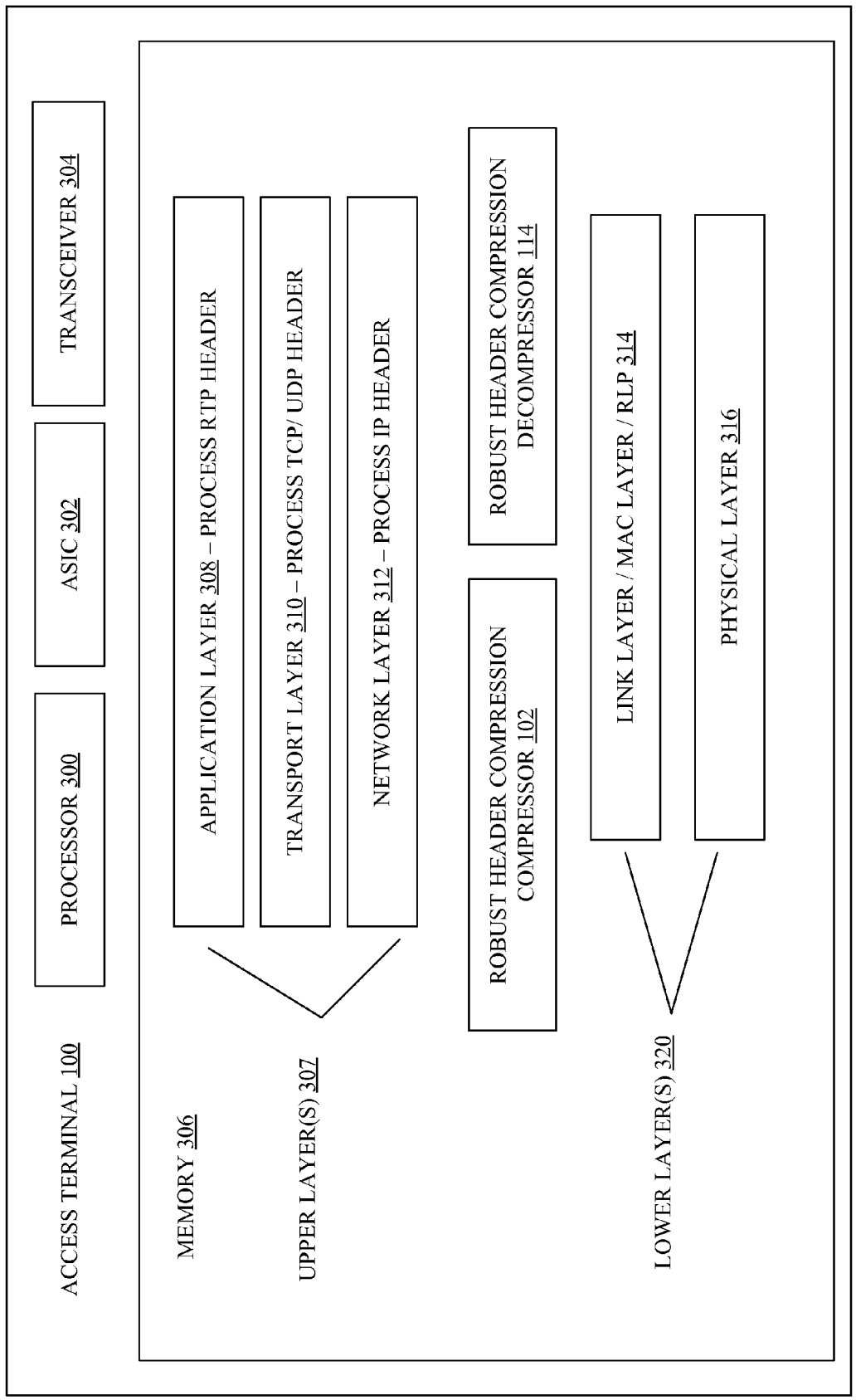
FIG. 3 illustrates some hardware and software components of an access terminal of FIG. 1.

FIG. 3 illustrates some hardware and software components of the access terminals 100A, 100B of FIG. 1, such as a processor 300, an ASIC 302 and other hardware, a transceiver 304, and a memory 306. The memory 306 may store one or more upper layers 307, such as an application layer 308, a transport layer 310, and a network layer 312. The application layer 308 may process RTP headers. The transport layer 310 may process TCP and UDP headers. The network layer 312 may process IP headers.

The memory 306 may also store a robust header compression compressor 102, a robust header compression decompressor 114 and one or more lower layers 320, such as a link layer and a MAC layer 314, which may include a RLP sublayer, and a physical layer 316. Note alternate embodiments may include some or all of these functions, modules, or layers, which may be implemented in alternate configurations.

Figure 8:
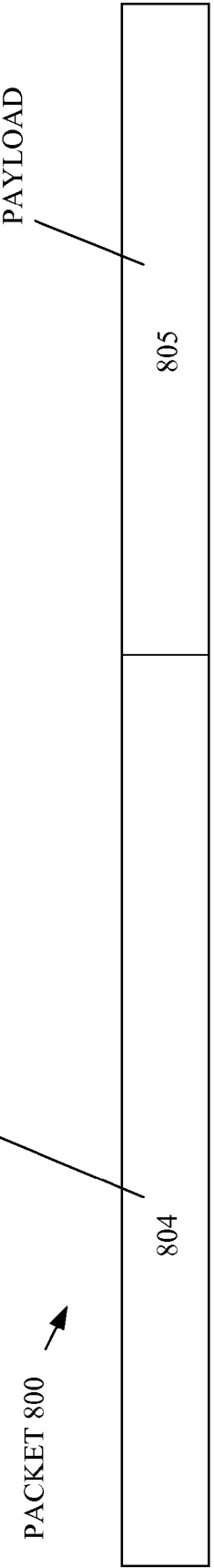
FIG. 8 illustrates an example of a packet with uncompressed headers and a packet with a compressed header.
Figure 8:
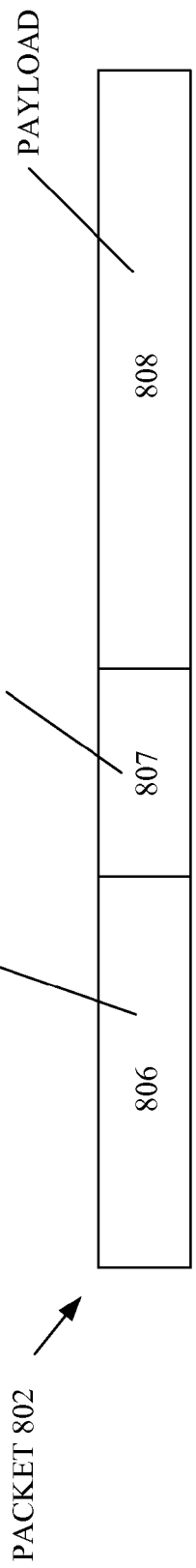

As used herein, a "packet" refers to a unit of transmission and reception. This unit of transmission and reception is compressed then decompressed by RoHC. A "packet stream" as used herein refers to a sequence of packets where the field values and change patterns of field values are such that the headers can me compressed using the same context. FIG. 8 illustrates an example of a packet 800 with uncompressed headers (e.g., IP, UDP, RTP, TCP, and other headers) 804 and a payload 805.

Compression techniques are used to compress the header portion of packet 800 resulting in compressed packet 802 with a compressed header portion 807, and a payload 808.

The compressed header portion 807 may include an RTP sequence number, a UDP checksum and possibly other fields. The compressed packet 802 may also include a link layer header portion 806, including a link layer sequence number. The decompression methods and apparatus described herein may be used to receive and decompress the compressed packet 802.

Packets with IP, UDP, and RTP headers sent over wireless links benefit considerably from header compression because wireless networks have limited bandwidth. Header compression and decompression improve network transmission efficiency, quality, and/or speed with bandwidth savings (due to reduced packet header overhead), reduce packet loss, improve interactive response time, and decrease infrastructure cost (more users per channel bandwidth and hence less deployment costs).

In a communication transmission, a "hop" refers to a communication link from one device to another device or a network element. A communication system may compress protocol headers on a per-hop basis over point-to-point connections, which may include many hops.

Header compression is made possible by the fact that there is significant redundancy between header fields within the same packet header and between consecutive packets belonging to the same packet stream. By sending static field information only initially and utilizing dependencies and predictability for other fields, the header size may be significantly reduced.

Some header compression methods, however, may not perform well over wireless (e.g., cellular) links due to the high error rates, e.g., bit error rates (BERs) and long roundtrip times of wireless links, especially as wireless topologies and traffic patterns become more complex. The present disclosure describes robust header compression (RoHC) and decompression methods, which overcome shortcomings of other methods, such as those described in Request For Comments (RFC) 3095.

Robust header compression is generally described in request for comments (RFC) 3095, entitled "Robust Header Compression (RoHC): Framework and four profiles: RTP, UDP, ESP and uncompressed," by C. Borman, et al., July 2001, published by the Internet Engineering Task Force, and distributed by the Network Working Group of The Internet Society. A "robust" header compression scheme tolerates loss and residual errors on a link over which header compression takes place without losing additional packets or introducing additional errors in decompressed headers.

The context of a compressor refers to state information a compressor uses to compress a header. Context of a decompressor refers to state information a decompressor uses to decompress a header. The context may contain relevant information from previous headers in the packet stream, such as static fields and possible reference values for compression and decompression. The context may contain additional information describing the packet stream, such as information about how an IP Identifier field changes and the typical inter-packet increase in sequence numbers or timestamps.

Context damage refers to the situation where the context of the decompressor is not consistent with the context of the compressor, and decompression may therefore fail to reproduce the original header. This situation may occur when the context of the decompressor has not been initialized properly or when packets have been lost, reordered or damaged between compressor and decompressor. Packets that cannot be decompressed correctly due to inconsistent contexts are considered lost/damaged due to context damage.

RoHC may use a cyclic redundancy check (CRC) over an original header to detect incorrect decompression. In order to reduce computational complexity, the fields of the header may be conceptually rearranged when the CRC is computed, so that it is first computed over octets which are static (called CRC-STATIC) and then over octets whose values are expected to change between packets (CRC-DYNAMIC). In this manner, the intermediate result of the CRC computation, after it has covered the CRC-STATIC fields, can be reused for several packets.

Header compression is possible because there is much redundancy between header field values between packets and between consecutive packets. Most header fields may be compressed away since they may seldom or never change. In one example, only five fields, with a combined size of about 10 octets, need more sophisticated mechanisms. These fields include:

IPv4 Identification (16 bits) (IP-ID)
UDP Checksum (16 bits)
RTP Marker (1 bit) (M-bit)
RTP Sequence Number (16 bits) (SN)
RTP Timestamp (32 bits) (TS)

Least significant bits (LSBs) encoding may be used for header fields whose values are usually subject to small changes. With LSB encoding, the k least significant bits of the field value are transmitted instead of the original field value, where k is a positive integer. After receiving k bits, the decompressor derives the original value using a previously received value as a reference (v_ref). As an example, with LSB encoding, the binary 00001010 (corresponding to decimal 10), may be considered comprising most significant bits 0000, and least significant bits 1010. Using LSBs encoding, 1010 is transmitted to a receiving device such as a BTS-PDSN, instead of all eight bits. If successfully received, a decompressor at the receiving device may derive the originally transmitted packet value using a previously received value, e.g., v_ref. In one embodiment, v_ref represents the last correctly decompressed packet value. The compressor (decompressor) uses v_ref_c (v_ref_d), the last value that has been compressed (decompressed) as v_ref. Assuming successful decompression of the received header, the context of the decompressor is updated to 00001010 and the originally transmitted packet generated. Upon successful generation of the transmitted value, v_ref may be updated to the currently correctly decompressed value and stored.

In one embodiment, assuming a next value, 00001111 (decimal value 15), is to be transmitted, the least significant bits 1111 are transmitted and if successfully received, the decompressor updates its context by appending the received value 1111 to the most significant bits of the current context value. In this example, the current context value is 00001010, and the most significant bits are 0000. The decompressor would update its context value to 00001111 and generate the originally transmitted packet value.

LSB encoding and decoding is deemed correct if the compressor and the decompressor each use interpretation intervals in which the original value resides, and in which the original value is the only value that has the exact same k least significant bits as those transmitted.

The "interpretation interval" may be described as a function f (v_ref, k):

$$f(v\_ref, k) = [v\_ref - p, v\_ref + (2^k - 1 - p]$$ (Equation 1)

where p is an integer.

This equation is shown as:

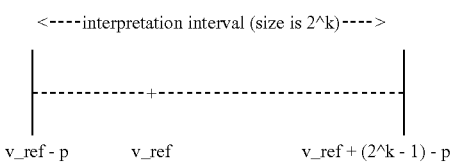

The function f has the following property: for any value k, the k least significant bits will uniquely identify a value in f (v_ref, k). The size of the interpretation interval is $2^k$. Thus for k=4, the size of the interpretation interval is $2^4$ or 16. A value of k=4 may be used for various packet types, including VoIP. The parameter p allows the interpretation interval to be shifted with respect to v_ref. Choosing an appropriate value for p yields more efficient encoding for fields with certain characteristics. In one embodiment, p is an integer value.

The interpretation interval may be divided into two portions. As illustrated below, assuming k=4, p=5, and v_ref=15, the left portion of the interpretation interval has a size of p=5, whereas the right portion of the interpretation interval has a size $p=2^k-p-1=10$.

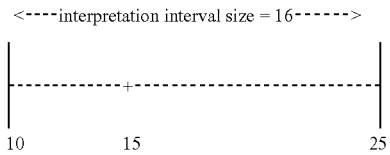

When compressing a value v, the compressor finds the minimum value of k such that v falls into the interval f(v_ref_c, k). K=g(v_ref_c, v). When only a few distinct values of k are possible, the compressor may instead pick the smallest k that puts v in the interval f(v_ref_c, v). When receiving m LSBs, the decompressor uses the interpretation interval f(v_ref_d, m) called interval_d. It picks as the decompressed value the one in interval_d whose LSBs match the received m bits. The values to be encoded may have a finite range. For example, the RTP SN ranges from 0 to 0xFFFF. When the SN value is close to 0 or 0xFFFF, the interpretation interval can straddle the wraparound boundary between 0 and 0xFFFF.

RFC 3095 describes how a RoHC compressor uses "window-based least significant bits (LSBs) encoding" to compress dynamic fields in protocol headers. The compressor may not be able to determine the exact value of v_ref_d, which is the reference value that will be used by the decompressor for a particular value v, since some candidates for v_ref_d may have been lost or damaged. However, by using feedback or by making reasonable assumptions, the compressor may limit the candidate set. The compressor then calculates k such that no matter which v_ref_d in the candidate set the decompressor uses, v is covered by the resulting interval_d. Since the decompressor may use the last received value where the CRC succeeded as the reference value, the compressor maintains a "sliding window" containing the candidates for v_ref_d. The sliding window may initially be empty.

When many consecutive packets are lost between the RoHC compressor and decompressor, there is a risk of sequence number (SN) LSB wraparound, i.e., the LSBs of sequence numbers in compressed packets may be interpreted incorrectly because the decompressor has not moved the interpretation interval for lack of input.

A RoHC decompressor may use a local repair mode to detect situations where a number of consecutive lost packets (between the compressor and decompressor) can cause context damage. The RoHC decompressor may detect this situation and avoid context damage by using a local clock. For example, the RoHC decompressor may use the following algorithm described in RFC 3095, such as detailed in section 5.3.2.2.4. entitled "Correction of SN LSB wraparound," wherein:

(a) The decompressor notes the arrival time, a(i), of each incoming packet i. Arrival times of packets where decompression failed are discarded;

(b) When decompression fails, the decompressor computes INTERVAL_LLSN=a(i)−a(i−1), which is the time elapsed between the arrival of the previous, correctly decompressed packet and the current packet;

(c) If wraparound has occurred, INTERVAL_LLSN will correspond to at least $2^k$ inter-packet times, where k is the number of SN bits in the current header. A moving average of arrival times may be used to estimate packet inter-arrival time. Based on the estimate of packet inter-arrival time, the decompressor determines if INTERVAL_LLSN can correspond to $2^k$ inter-packet times;

(d) If INTERVAL_LLSN is determined to be at least 2^k packet inter-arrival times, the decompressor adds 2^k to the reference SN and attempts to decompress the packet using the new reference SN;

(e) If this decompression succeeds, the decompressor updates the context but should not deliver the packet to upper layers. The following packet is also decompressed and updates the context if its CRC succeeds, but should be discarded. If decompression of the third packet using the new context also succeeds, the context repair is deemed successful and this third packet and subsequent decompressed packets are delivered to the upper layers;

(f) If any of the three decompression attempts in (d) and (e) fails, the decompressor discards the packets and may act according to rules (a) through (c) in section 5.3.2.2.3 of RFC 3095, entitled "actions upon CRC failure."

Using the above local repair mode, the decompressor may be able to repair the context after excessive loss at the expense of discarding two correctly decompressed packets before concluding that the context has been repaired. The reason that the RoHC decompressor needs to discard two packets (not passed to the upper layer) is that the RoHC 3-bit CRC is a relatively weak check, and hence incorrectly decompressed packets may pass the CRC.

Thus, local repair is invoked only when a check on the amount of time passed since the last received packet passes. This check is based on an estimate of the inter-arrival time and it is optional for the decompressor to maintain this estimate. Moreover, in some cases (i.e., when timer-based compression is not supported), such local repair may be completely disabled.

Embodiments described below enhance or improve the local repair mode in a RoHC decompressor, such as decompressors 110, 114 in FIGS. 1-3. In one example, the RoHC decompressor in local repair mode uses lower layer information, such as link layer sequence numbers to correctly decompress the packet. In another example, the RoHC decompressor in local repair mode uses UDP checksum (when enabled), in addition to the RoHC 3-bit CRC, to determine whether to pass packets to an upper layer. A decompressor may be configured to select one or both of the two methods depending on one or more conditions. These examples improve performance without changing the RoHC standard.

Using Lower Layer Information in Decompression Repair

Figure 4:
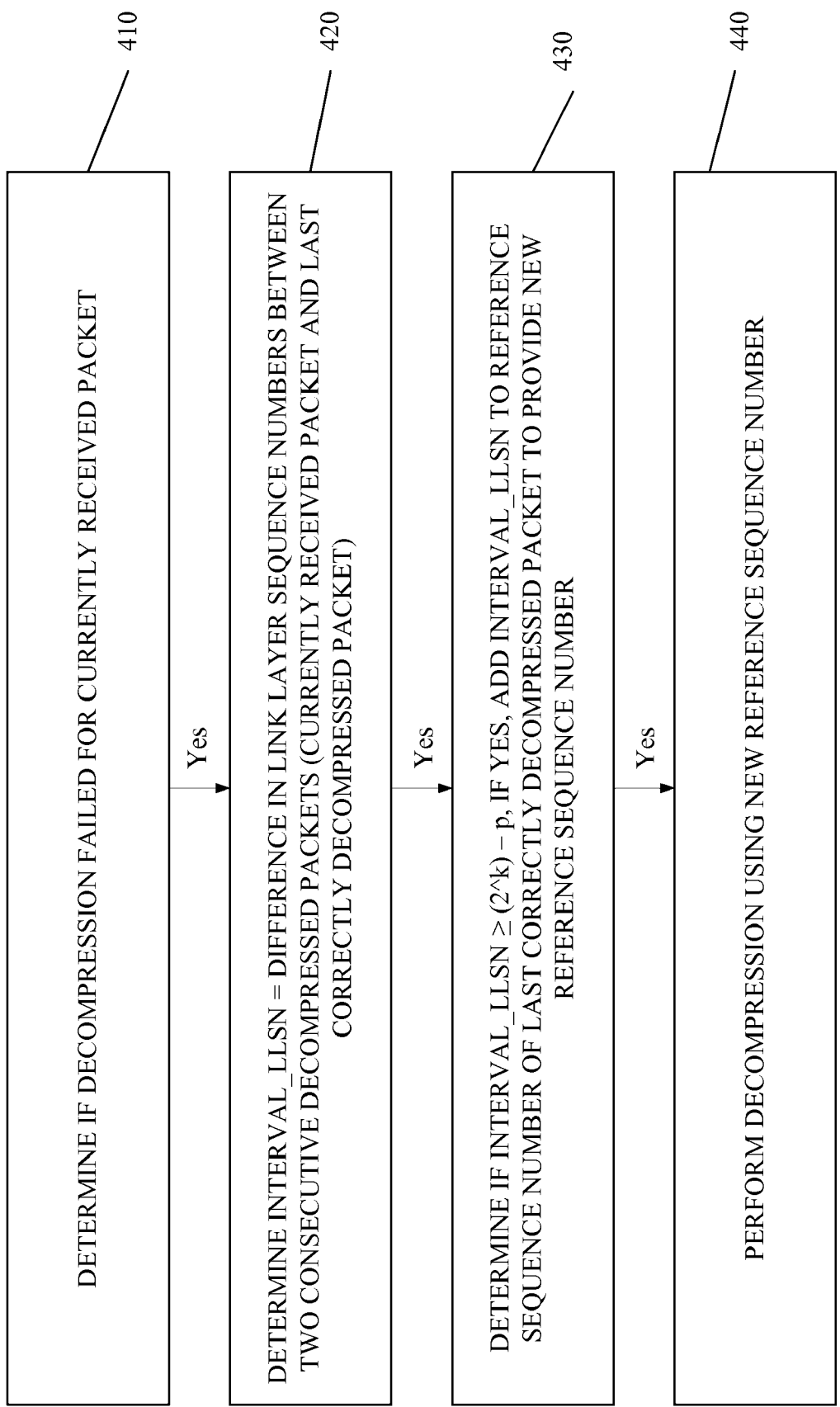
FIG. 4 illustrates a method for enhancing local repair in robust header decompression, which may be used by the system of FIG. 1.

FIG. 4 illustrates a method that uses link layer information to enhance the local repair mode in a RoHC decompressor 110, 114. The link layer 214, 314 (a lower layer in FIGS. 2 and 3) adds a link layer sequence number (SN) to each packet compressed by the compressor 112, 102. The sequence number should increase by one ("1") for each link layer packet sent over a particular instantiation of the link layer. There is a one-to-one mapping between IP packets and link-layer packets corresponding to a particular link layer instantiation. Even if this one-to-one mapping is violated, the method described below may still be implemented.

At 410 in FIG. 4, the decompressor determines if decompression failed for a currently received packet, for example, by detecting a CRC failure using the RoHC CRC. If decompression failed, the decompressor at 420 determines the difference in link layer sequence numbers between two consecutive correctly received and correctly decompressed packets. In other words, the difference between link layer sequence number of the last correctly decompressed, received packet and link layer sequence number of the currently received packet is determined. This difference may be referred to as the link layer serial number interval or INTERVAL_LLSN, which is not the same as the "interpretation interval" or "INTERVAL" mentioned above with reference to RFC 3095.

At 430, the decompressor determines if INTERVAL_LLSN is equal to at least (2^k)−p, where k is the number of sequence number bits in the current packet and p is the shift to the interpretation interval to handle reordering. If INTERVAL_LLSN is equal to at least (2^k)−p, the decompressor adds INTERVAL_LLSN to the sequence number of the last correctly decompressed, received packet (called the reference sequence number). This action may be referred to as repairing information used for decompression.

At 440, the decompressor attempts to decompress the current packet using the new reference sequence number.

If this decompression succeeds, the decompressor updates its context and delivers the packet to the upper layer(s). If decompression fails, the decompressor may discard the packets and act according to rules (a) through (c) in section 5.3.2.2.3 of RFC 3095.

In addition to improving the local repair mode, another advantage of using the link layer sequence number is that it enables the decompressor to handle excessive re-ordering on the link. The link layer sequence number helps identify the correct positions of late-arrival RoHC packets, so the decompressor may correctly infer the RTP sequence number from the reference value in the current context of the decompressor.

In some situations, there may not be a one-to-one mapping between the link layer sequence number and the RTP sequence number. For example, on a reverse link in a wireless network, a user at a cell edge (e.g., working at 4.8 kbps) may need to send one RTP/UDP/IP voice packet in two RLP segments.

Figure 5:
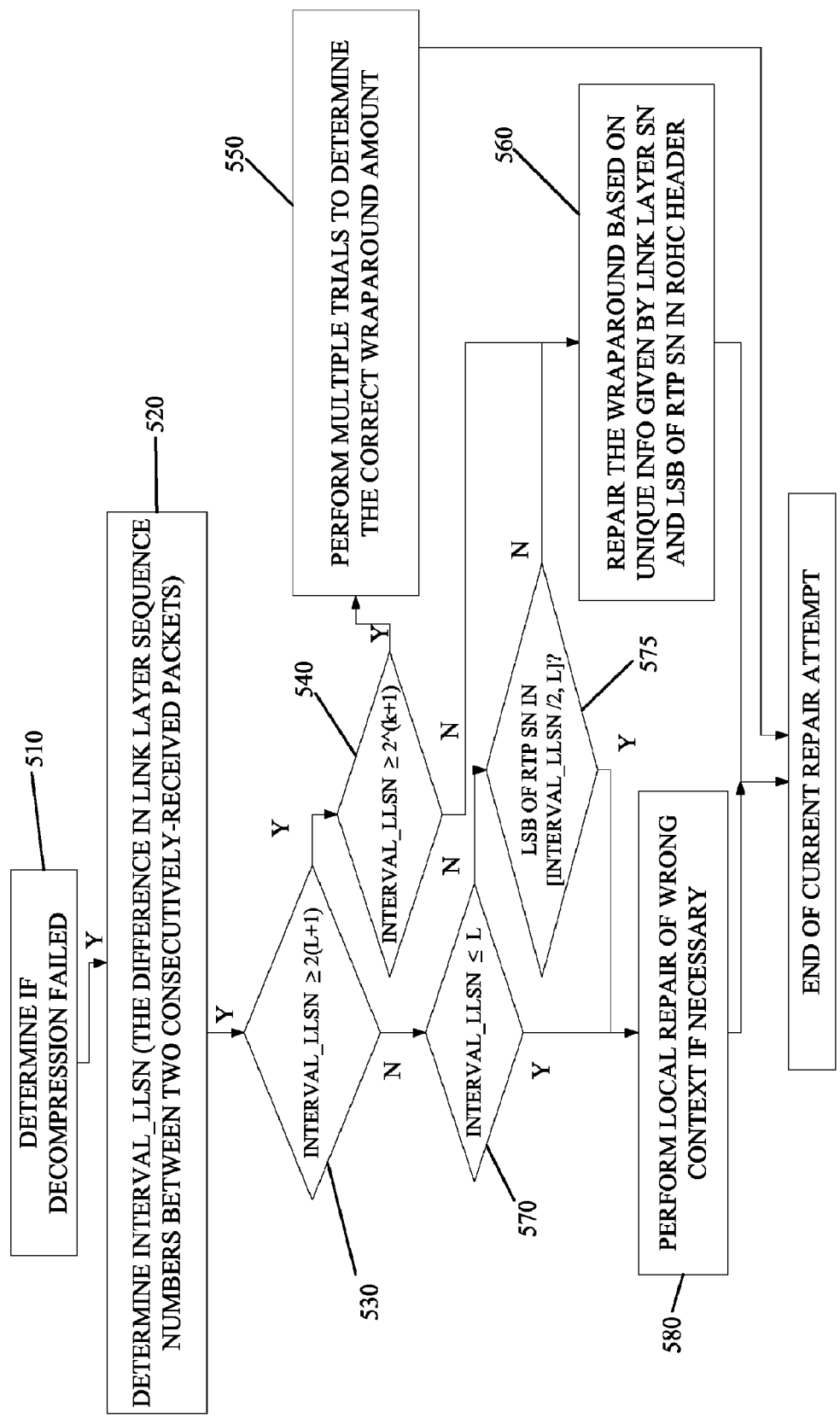
FIG. 5 illustrates another method for enhancing local repair in robust header decompression, which may be used by the system of FIG. 1.

FIG. 5 shows a method that may be used in such situations (no one-to-one mapping between the link layer sequence number and the RTP sequence number) to determine whether SN wraparound occurred and how to perform local repair. The following method assumes that the RTP sequence number and the link layer sequence number for the last correctly decompressed packet are zero ("0"). A non-zero reference value may be handled by first performing a difference operation.

At 510, the decompressor determines if decompression failed, for example, by detecting a decompression error due to the failure of RoHC CRC. If decompression failed, the decompressor at 520 computes INTERVAL_LLSN, which is the difference in link layer sequence numbers between two consecutive correctly received and correctly decompressed packets, i.e., link layer sequence number of current packet minus a reference value (link layer sequence number of last received, correctly decompressed packet).

The LSB interpretation interval (described above) may have a right half with a length expressed as L, where L is smaller than 2^k. If INTERVAL_LLSN is greater than or equal to 2*(L+1) at 530, then a wraparound occurred, and processing continues to step 540; else processing continues to step 570.

If INTERVAL_LLSN is greater than or equal to 2^(k+1) at 540, then the decompressor at 550 attempts to determine the correct wraparound amount by decompressing the packet with multiple trials using interpretation intervals [L+1, 2*(L+1)−1], [2*(L+1), 3*(L+1)−2], . . . , [k*(L+1), (k+1)*(L+1)−(k)], where INTERVAL_LLSN is defined as k*(L+1)≦INTERVAL_LLSN≦(k+1)*(L+1)−(k). Because decompression in the correct interpretation interval will pass the RoHC's 3-bit CRC, at least one of these decompressions will be successful. If only one of the decompressions is successful, the packet may be sent to the upper layer. If more than one of the decompressions are successful, the decompressor may not be sure about the correct interpretation interval, and the packets are not sent to the upper layer.

If INTERVAL_LLSN is less than 2^(k+1) at 540, the actual RTP SN lies between [INTERVAL_LLSN/2, INTERVAL_LLSN]. Because INTERVAL_LLSN/2 is less than or equal to 2^k, the LSB of RTP SN, which contains k bits, may be used to uniquely identify the correct RTP SN position at 560. The decompressor may repair the wraparound based on unique information given by link layer SN and LSB of RTP SN in the RoHC header.

If INTERVAL_LLSN is less than or equal to L at 570, then there is no wraparound and the method performs local repair of wrong context if necessary at 580. Else, processing continues to step 575.

If the LSB of RTP SN is in the range defined as [INTERVAL_LLSN/2, L] at 575, then processing continues to step 580 to perform local repair of wrong context if necessary. Else, processing continues to step 560 to repair the wraparound based on the link layer SN and the LSB of the RTP SN in the RoHC header.

The method of FIG. 5 works even if there are IP packet losses before the RoHC compressor.

Figure 6:
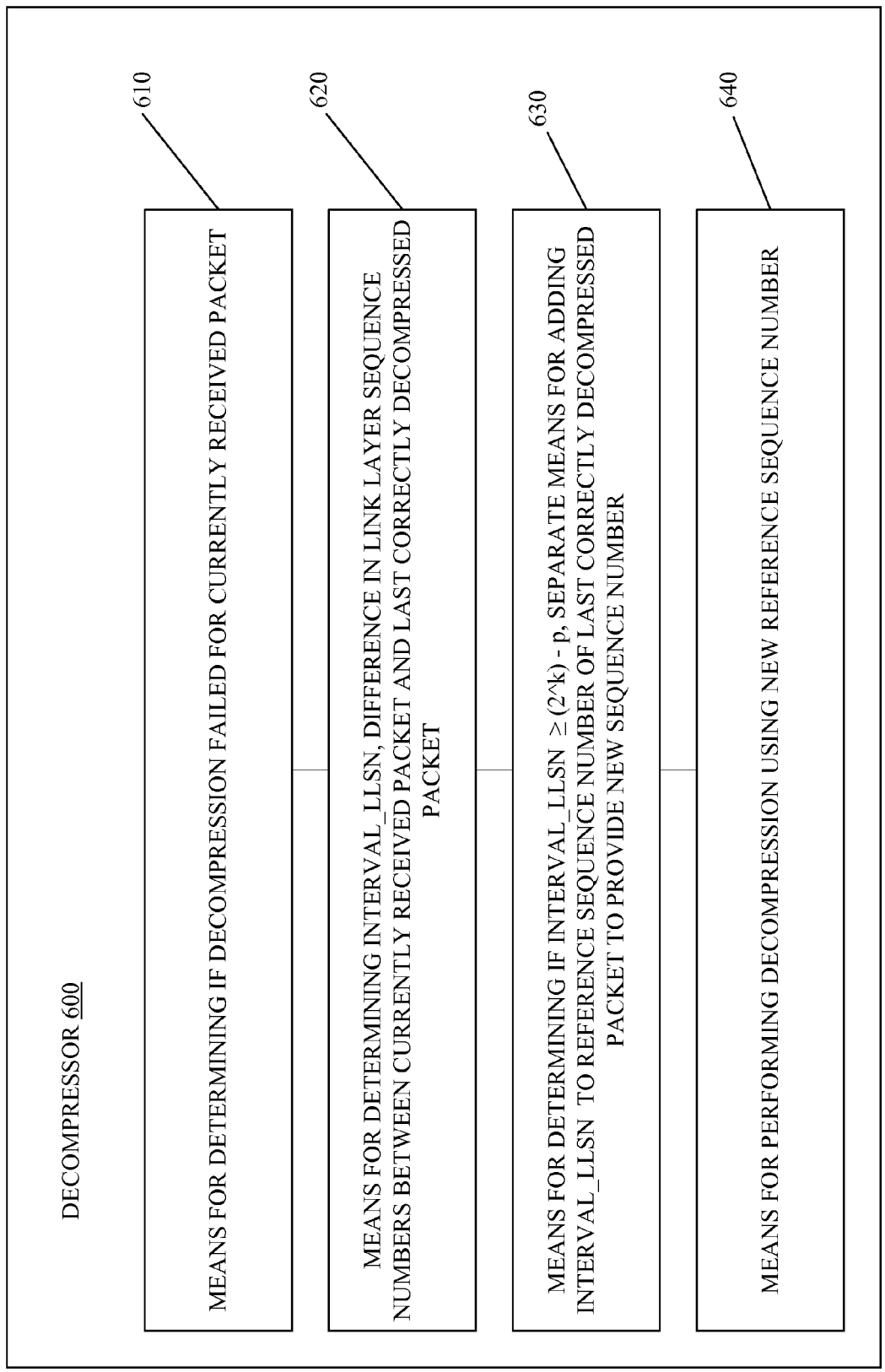
FIG. 6 illustrates a decompressor apparatus corresponding to the method of FIG. 4.

FIG. 6 illustrates a decompressor apparatus 600 corresponding to the method of FIG. 4. The decompressor apparatus 600 comprises means 610 for determining if decompression failed for currently received packet, means 620 for determining an interval, which is equal to a difference in link layer sequence numbers between two consecutive correctly received and correctly decompressed packets (currently received packet and last correctly decompressed packet), means 630 for determining if interval is greater than or equal to 2^k−p, and adding interval to reference sequence number of last correctly decompressed packet, and means 640 for performing decompression using new reference sequence number.

Figure 7:
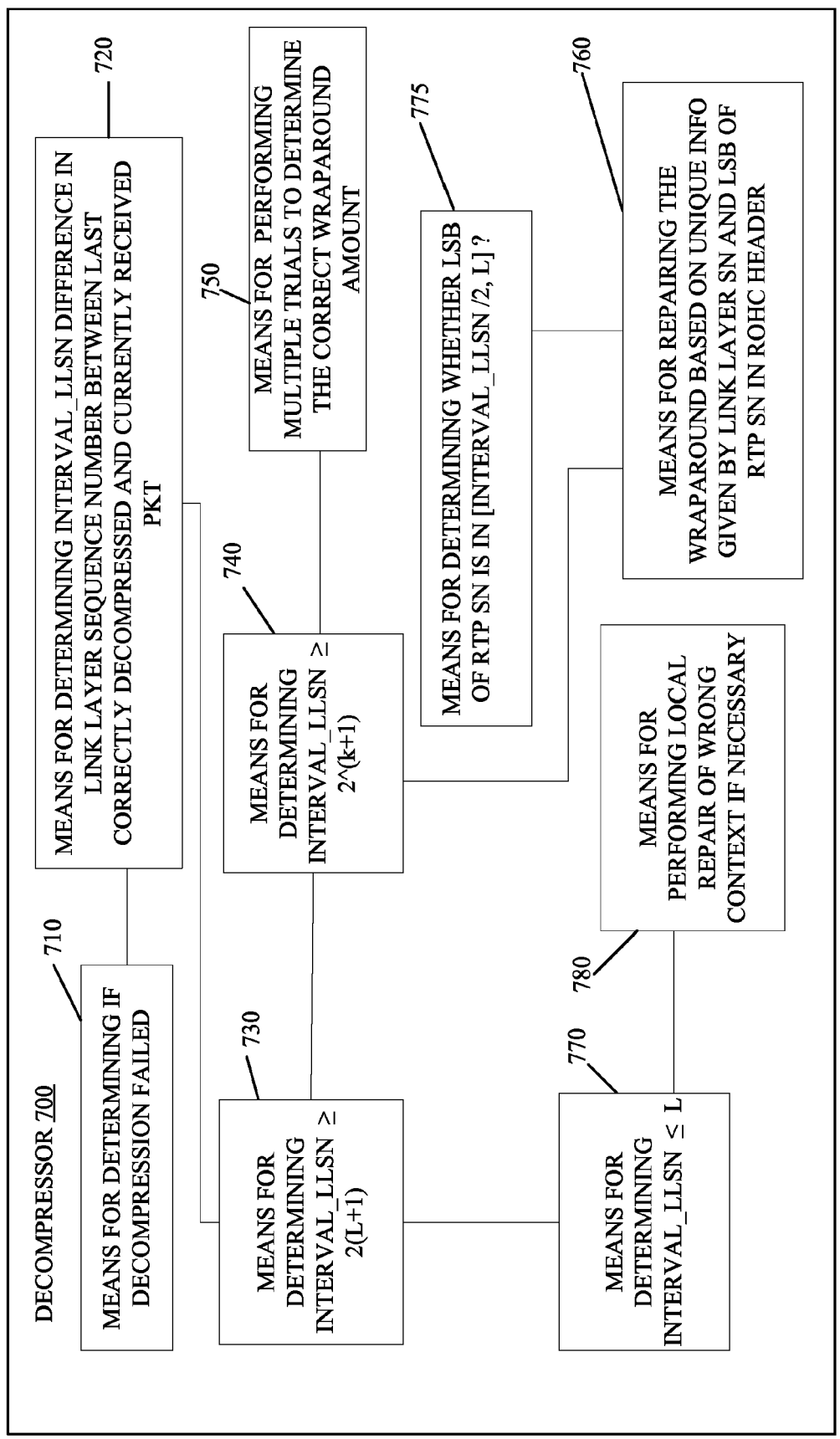
FIG. 7 illustrates a decompressor apparatus corresponding to the method of FIG. 5.

FIG. 7 illustrates a decompressor apparatus 700 corresponding to the method of FIG. 5. The decompressor apparatus 700 comprises means 710 for determining if decompression failed, means 720 for determining interval, which is the difference in link layer sequence number between two consecutive correctly received and correctly decompressed packets, means 730 for determining interval≧2(L+1), means 740 for determining interval≧2^(k+1), means 750 for performing multiple trials to determine the correct wraparound amount, means 760 for repairing the wraparound based on unique info given by link layer SN and LSB of RTP SN in RoHC header, means 770 for determining interval≦L, means 775 for determining whether LSB of RTP SN is in [interval/2, L], and means 780 for performing local repair of wrong context if necessary.

In an example, once the decompressor knows the difference between the LL SN of the current received packet and the LL SN of the last correctly decompressed packet, it determines exactly which interpretation interval the current packet lies in. This interpretation interval may be determined based on the ratio of the difference in LL SN and the interpretation interval size corresponding to the number of bits used to represent the RTP SN field. As an example, if difference in LL SN=8 and 4 bits are used to represent the RTP SN field (corresponding to an interpretation interval size of 16) and p=5, the decompressor should attempt to decompress in the current interpretation interval; if LL SN=16 and 4 bits are used to represent the RTP SN field, the decompressor should attempt to decompress in the next interpretation interval; if LL SN=−6 and 4 bits are used to represent the RTP SN field, the decompressor should attempt to decompress in the previous interpretation interval.

This can be represented by Equation 2 shown below. The decompressor may attempt to decompress in the interpretation interval given by:

$$I=0, \text{ if } 0<=\Delta LL\_SN<=2^k-p-1$$

$$I=\text{ceiling}((\Delta LL\_SN-(2^k-p-1))/(2^k)) \text{ if } \Delta LL\_SN>2^k-p-1$$

$$I=-1, \text{ if } -p<=\Delta LL\_SN<0$$

$$I=-1+\text{floor}((\Delta LL\_SN-p)/2^k), \text{ if } \Delta LL\_SN<-p \qquad \text{(Equation 2)}$$

wherein ΔLL_SN is the difference in LL SN between the current packet and the last correctly decompressed packet, k is the number of bits used to represent the compressed field, p is the amount of negative change the decompressor can tolerate. Also, interpretation interval 0 corresponds to the current interval, 1 corresponds to next interpretation interval, −1 corresponds to previous interpretation interval and so on. With this knowledge, the timer check to determine if local repair should be used may be disabled.

Using UDP Checksum in Decompression Repair

Another method may use a UDP checksum to enhance/improve the local repair mode in the RoHC decompressor. Incorporation of a UDP checksum is illustrated in the packet of FIG. 8. The UDP checksum provides for error detection and a 16 bit checksum field may be used for error checking the header and data. Use of a UDP checksum, when available, enables the RoHC decompressor to have greater confidence in decompressed packets during the local repair mode. The UDP checksum may be enabled in the IP flow. This is the case for IPv6. The following method improves the local repair mode in RoHC, as described by RFC 3095, by using a UDP checksum, wherein:

(a) The decompressor notes the arrival time a(i) of each incoming packet i. Arrival times of packets where decompression failed are discarded;

(b) When decompression fails, the decompressor computes INTERVAL_LLSN=a(i)−a(i−1), i.e., the time elapsed between the arrival of the previous, correctly decompressed packet and the current packet;

(c) If wraparound has occurred, INTERVAL_LLSN will correspond to at least 2^k inter-packet times, where k is the number of SN bits in the current header. On the basis of an estimate of the packet inter-arrival time, obtained for example using a moving average of arrival times, TS_STRIDE, or TS_TIME, the decompressor judges if INTERVAL_LLSN can correspond to 2^k inter-packet times;

(d) If INTERVAL_LLSN is judged to be at least 2^k packet inter-arrival times, the decompressor adds 2^k to the reference SN and attempts to decompress the packet using the new reference SN;

(e) If this decompression succeeds and the UDP checksum passes, the decompressor updates the context and delivers the packet to the upper layer. As used herein, the UDP checksum passes, for instance, when the checksum calculated by the UDP layer is the same as the UDP header checksum (i.e. there are no detected errors). If the decompression fails or the UDP checksum does not pass, the decompressor discards the packets and may act according to rules (a) through (c) of section 5.3.2.2.3 of RFC 3095 described hereinabove.

The UDP checksum (when enabled) may also be incorporated into the methods illustrated in FIG. 4 or 5 to further verify whether decompression is successful.

Figure 9:
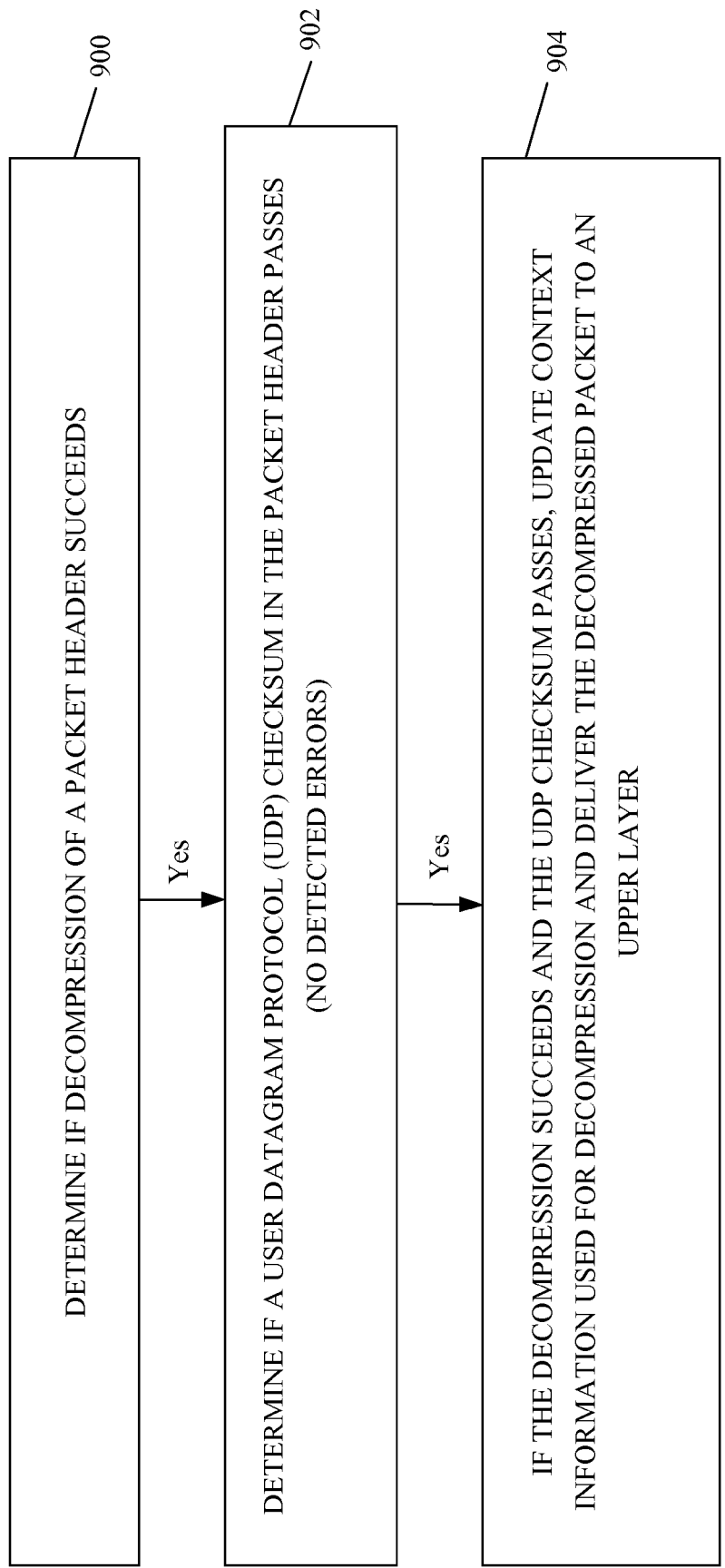
FIG. 9 illustrates a method of using a checksum in determining if decompression succeeds.

FIG. 9 illustrates a method of using the UDP checksum as described above. At 900, the method determines if decompression of a packet header succeeds. At 902, the method determines if a UDP checksum in the packet header passes. At 904, if the decompression succeeds and the UDP checksum passes, the method updates context information used for decompression and delivers the decompressed packet to an upper layer.

Figure 10:
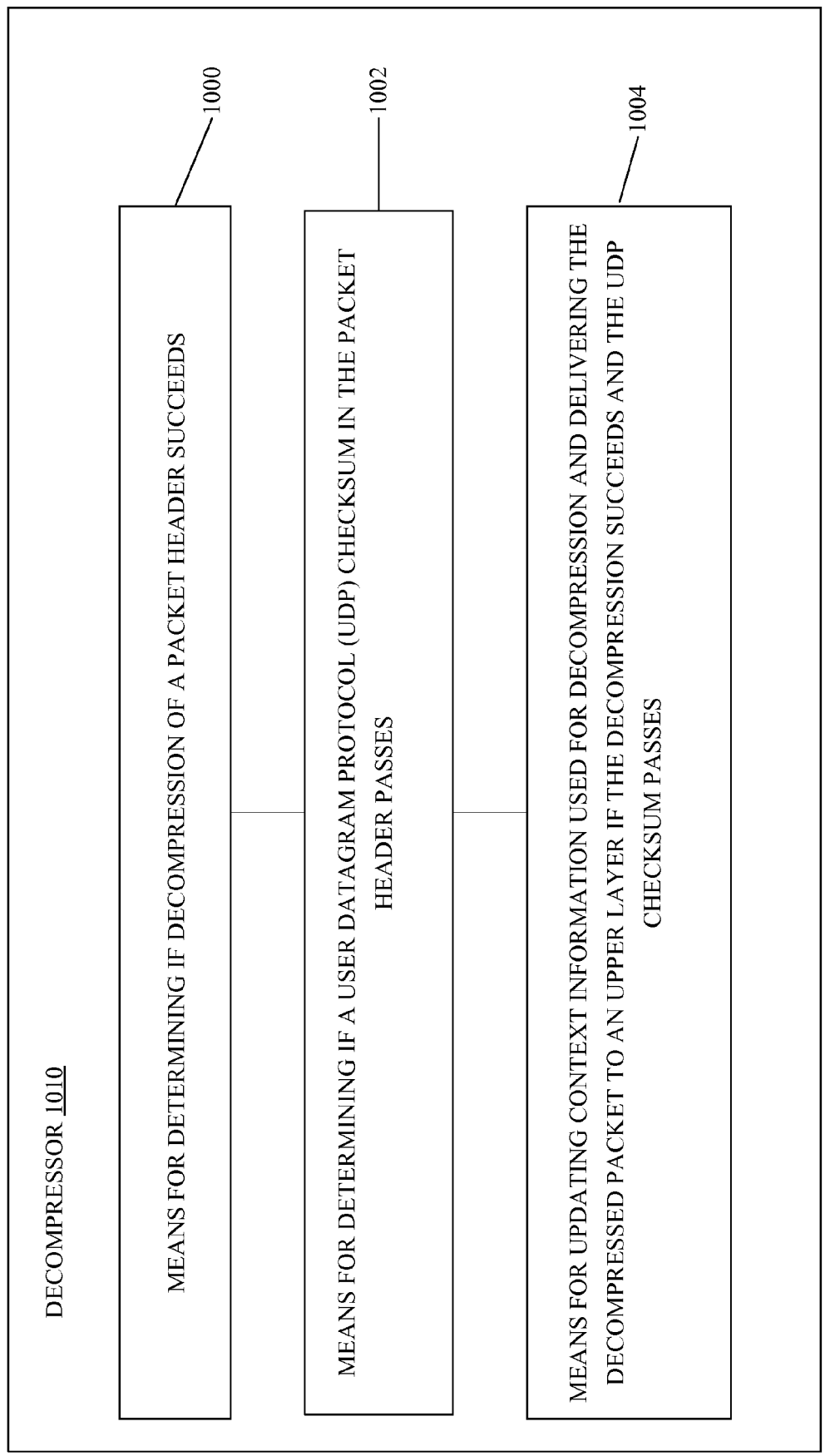
FIG. 10 illustrates a decompressor corresponding to the method of FIG. 9.

FIG. 10 illustrates a decompressor 1010 corresponding to the method of FIG. 9.

The decompressor 1010 comprises means 1000 for determining if decompression of a packet header succeeds, means 1002 for determining if a user datagram protocol (UDP) checksum in the packet header passes, means 1004 for updating context information used for decompression and delivering the decompressed packet to an upper layer if the decompression succeeds and the UDP checksum passes.

Disabling Enhanced Local Repair

Enhanced local repair may be disabled in certain scenarios where there is no one-to-one mapping between transmitted RTP packets and LL sequence numbers. For example, multiple IP flows may share the same local link and thus, the same LL sequence number space. In other words, multiple IP flows sent on the same local link share the LL SN space. As a result, LL sequence numbers may not indicate how much of a jump in LL SN is caused by that flow. Thus, enhanced local repair may be disabled.

In a second scenario, an RLP Reset may be signaled, for instance in a link layer of a protocol such as 1xEV-DO (Rev. 0, Rev. A, Rev. B), referred to as high rate packet data (HRPD). When the RLP Reset message is received, for instance, in an intersystem handoff from one BSC to another, the RLP sequence number may start from zero. In this case, it may not be possible to determine the jump in LL SN. Thus, enhanced local repair may be disabled for the first N packets received after RLP was Reset. (Other link layers may have a similar concept as RLP Reset and this technique may be applied to those too).

In a third scenario, enhanced local repair may be disabled when an Octet-based RLP is implemented. In an octet-based RLP, the RLP SN increases by the size of a packet. Packet size may vary, therefore when RLP is used in the octet-based mode, it may not be possible to determine how many packets correspond to the missing SN space.

In one example, in order to disable enhanced local repair, certain information may be passed between the RoHC stack and the lower layer interface. This information includes LL SN and LL SN Range information passed to the RoHC decompressor and several algorithms. These algorithms may include an algorithm to disable functionality for the entire flow if RLP is segment-based or multiple flows are sharing RLP; an algorithm to disable enhanced local repair for a few RTP packets after RLP is reset; and an algorithm to disable enhanced local repair for a flow for which enhanced local repair was earlier enabled. This may happen for instance, if a second flow starts on a Link Flow, which was previously carrying a single flow.

At initialization, a value for N, an Upper Value of LL SN Range and a Lower Value of LL SN Range may be provided on a per flow basis. N represents the number of packets for which the enhanced local repair is disabled after receiving a function EnhancedLocalRepairReset( ). If both the upper and lower value of the LL SN Range are set to 0, then enhanced local repair is disabled. The size of the LL SN Range is defined as [(Upper Value of LL SN Range)−(Lower Value of LL SN Range+1)]. In one example, (DO Rev A,) the default Upper Value of LL SN Range is +31 and the Lower value of LL SN Range is −32.

In an example, LL SN, the unsigned sequence number of the LL packet, is provided for every packet. The LL SN space and the LL SN Range (as defined above) may be the same size. For example, if the Upper Value of LL SN Range is +31 and the Lower Value of LL SN Range is −32, the LL SN Range size is 64, thus, the LL SN is in the range [0, 63]. A function "EnhancedLocalRepairReset" may be provided on a per flow basis wherein this function disables enhanced local repair for N packets.

Handling Case where RoHC CRC False Passes

There may be a large positive or negative change between packets received at a decompressor when there are dropped intermediate packets between the compressor and decompressor. The ability of enhanced local repair to aid in correctly decompressing packets which may have too big a positive or negative change from the previous packet depends on the packet failing the RoHC CRC check. For example, assume a first packet is compressed and sent with a first RTP $SN_1$, and is correctly decompressed. However, the next x compressed packets are dropped over the link, i.e., they never reach the decompressor. If RTP SN's are assigned consecutively, and assuming the dropped packets were RTP packets, an (x+1)th successfully transmitted packet will be assigned the next consecutive RTP SN corresponding to RTP $SN_{(1+x+1)}$. Upon successful receipt of the (x+1)th packet, decompressor context information may correspond to the first successfully decompressed packet, v_ref. and the decompressor may attempt to update its context based on v_ref. In one example, the LSB's of the (x+1)th packet will be attempted to be appended to the MSB's of the 1st packet that was successfully decompressed. Since successfully updating the context information of the decompressor and regenerating the transmitted packet depends on v_ref, the dropped packets may cause the current packet (x+1) to be decompressed incorrectly.

In one example, a 3 bit RoHC CRC check is implemented. Generally, there is a $\frac{1}{2}^3$ (⅛th) probability that a 3 bit CRC will not detect an incorrectly decompressed packet. Thus, the RoHC CRC check may still pass even when a packet is incorrectly decompressed. In this scenario, a (x+1)th incorrectly decompressed packet may not be caught and a next compressed packet, (x+1+1), may be sent to the decompressor. This packet is assigned an RTP $SN_{(x+1+1)}$ and will also be incorrectly decompressed. The probability of not catching the second CRC failure becomes $(\frac{1}{2}^3)(\frac{1}{2}^3)$ or ¹⁄₆₄, thus there is a greater chance the (x+1+1)th incorrectly decompressed packet will be detected in this iteration. Local repair is invoked only when the decompressed packet fails the RoHC CRC check. Assume the (x+1+1)th packet fails the CRC check. In the above scenario, a jump between a first decompressed packet and decompressed packet (x+1) was not detected, since packet (x+1) did not fail the CRC check. When the CRC eventually fails, only the jump between decompressed packet (x+1) and decompressed packet (x+1+1) is detected.

Figure 11:
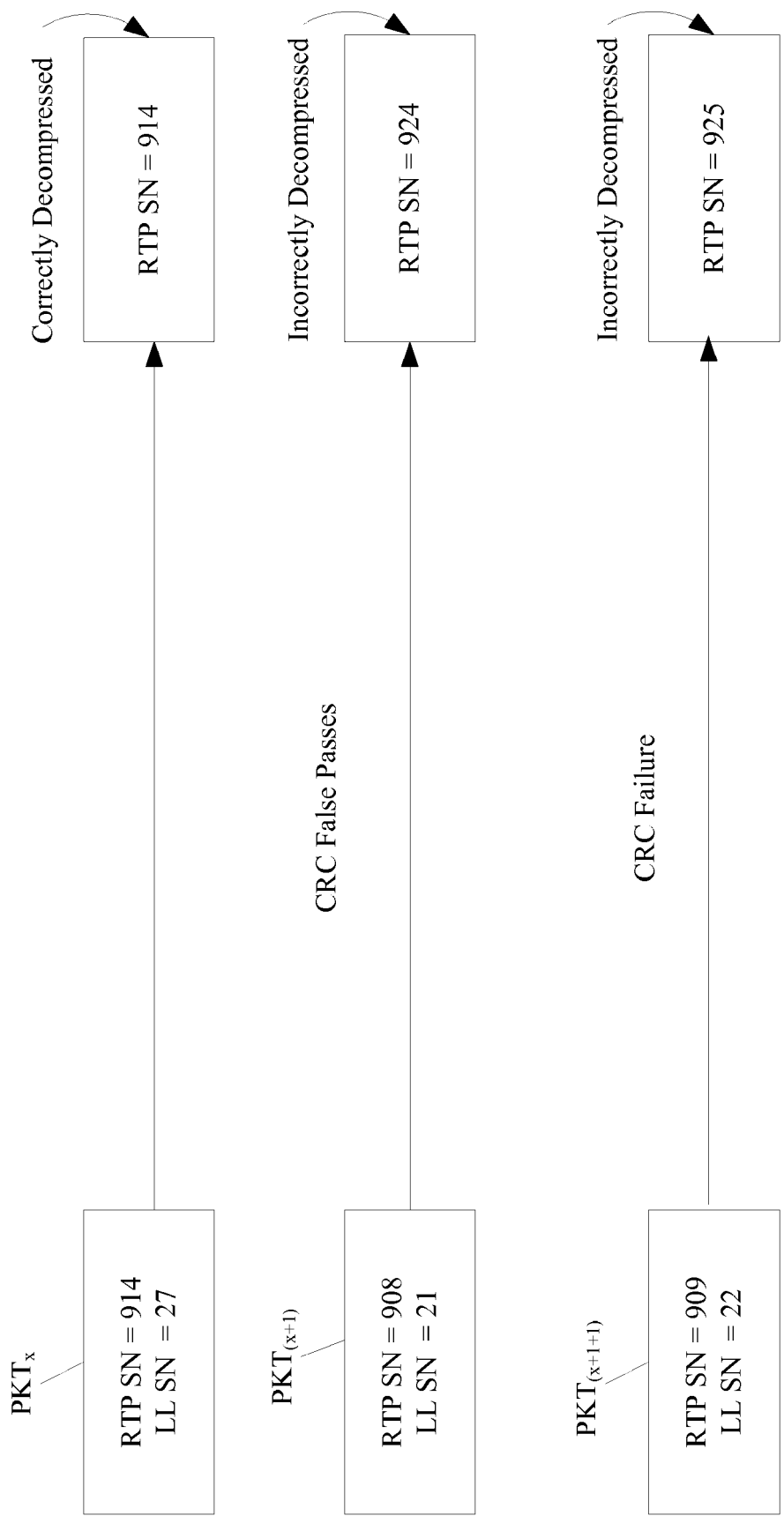
FIG. 11 illustrates an example of a robust header compression (RoHC) and cyclic redundancy check (CRC) false pass.

FIG. 11 illustrates the above scenario. Referring back to the interpretation interval of equation 2, an assumed value of p=5 means the decompressor may tolerate a negative reordering of up to 5. First, a compressed packet with an RTP SN of 914 (and LL SN of 27) is transmitted and correctly decompressed. A next packet with an RTP SN 908 (LL SN=21) is transmitted but incorrectly decompressed as corresponding to RTP SN 924 since this falls outside of what the p value may accommodate in the current interpretation interval. Assuming a 3-bit CRC packet, even though the decompressed packet is incorrect, the CRC passes since there is only a ⅛ probability that the CRC fails. Thus, the context of the decompressor is updated to correspond to RTP SN 924. This scenario is referred to as a CRC false pass.

When a subsequent packet with an RTP SN of 909 (and LL SN=22) is transmitted, as shown in FIG. 11, decompression results in a value corresponding to RTP SN 925. The probability of detecting the CRC false pass decreases with each successive 3-bit CRC and is (⅛)(⅛) or 1/64 in this scenario. Assuming the CRC failure is now detected, enhanced local repair is invoked. If the enhanced local repair only looks at the current (RTP SN=925) and previous (RTP SN=924) packets to decide which interpretation interval to decode the current packet in, the packet will be incorrectly regenerated (and dropped due to the CRC failure.) Since the difference in LL SN between the previous and the current packet is 1 (LL SN 22- LL SN 21), the decompressor will be caused to decompress in the current interpretation interval. However, this is the wrong interpretation interval since the context information of the decompressor was not correctly updated due to the false pass of the first packet (RTP SN 924). This example illustrates a CRC false pass for a large negative change; a similar scenario for CRC false pass can also happen for a large positive change.

In one example of the present invention, when there is a false pass, the correct interpretation interval to apply may be calculated by the following method:

For RTP SN=R1 and LL SN=L1 for a previous correctly decompressed packet, and for a current packet, LL SN=L2 and decompressed RTP SN=R2, If $|(L2-L1)-(R2-R1)|>THRESH$, assume a false CRC pass at the decompressor and Store DIFF=(R2-R1)-(L2-L1);

When a packet (with LL SN=L3) fails CRC and Local Repair is invoked, the interpretation interval to decompress should be chosen based on the value (L3-L2)-DIFF using the equations described in Equation 2;

If N consecutive packets decompress correctly, set DIFF=0.

Such a method enables enhanced local repair to work even when a RoHC CRC false pass has caused the state of the decompressor to be incorrectly updated as in FIG. 11.

Figure 12:
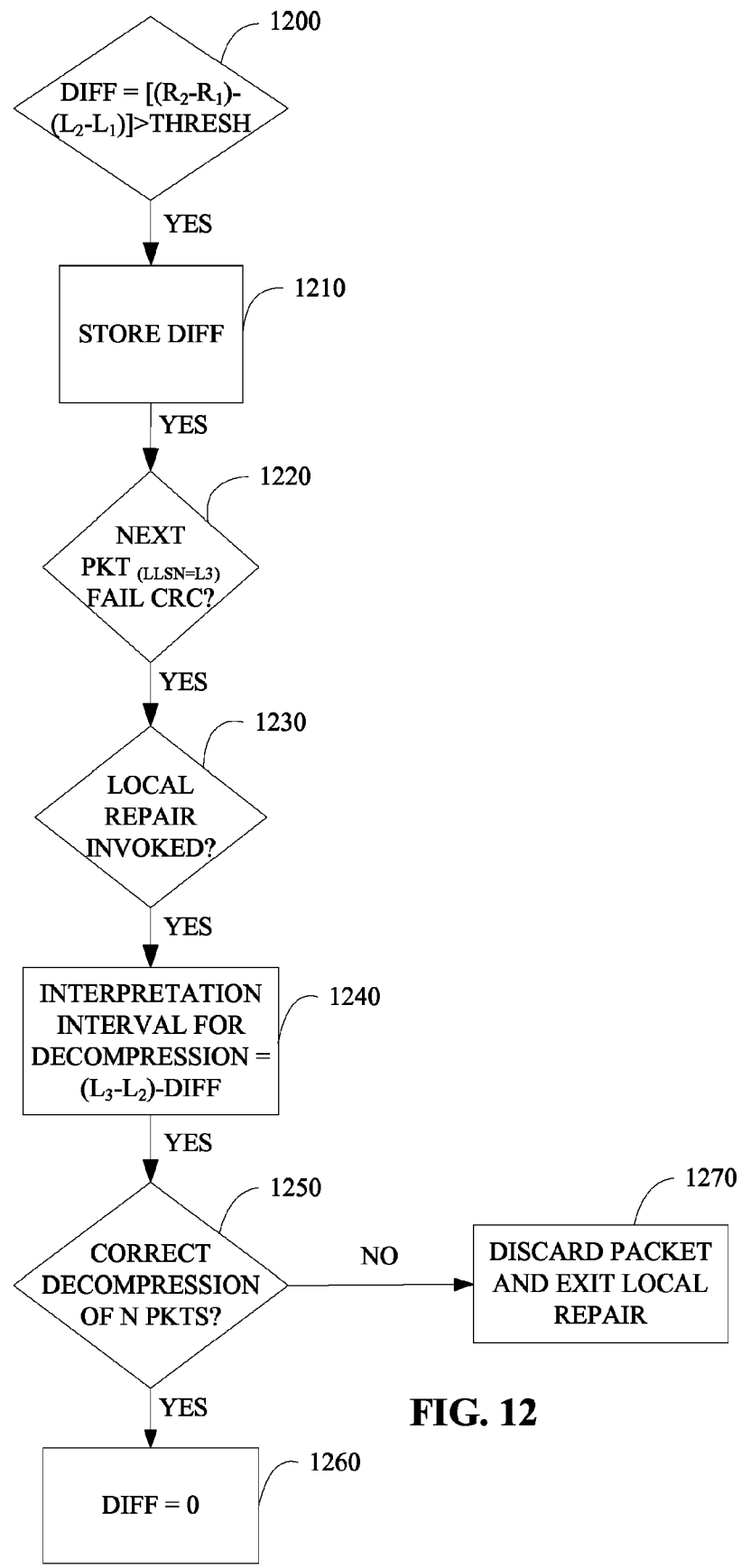
FIG. 12 illustrates a method for determining an interpretation interval for a packet.
Figure 13:
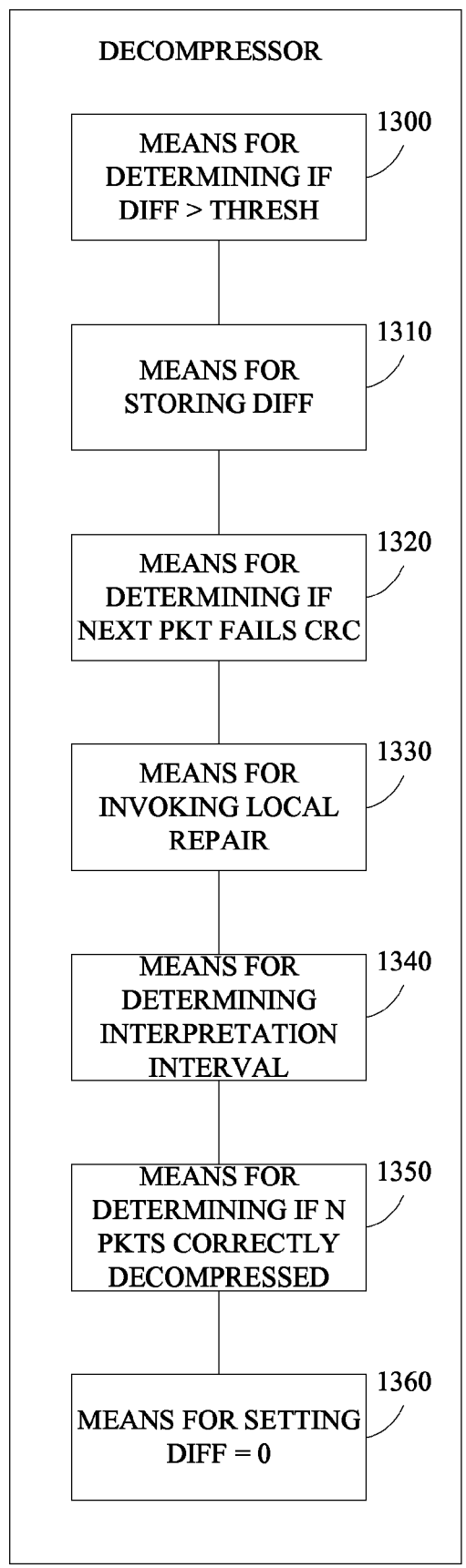
FIG. 13 illustrates an apparatus corresponding to the method of FIG. 12.

FIG. 12 illustrates a method for determining an interpretation interval for a packet when a false pass occurs. As illustrated, in 1200, it is determined whether DIFF is greater than a threshold value. DIFF is defined above. If the value is greater than the threshold, DIFF is stored in step 1210. Next, it is determined in 1220 whether a next decompressed packet fails a CRC check. Local repair is invoked at step 1230 and the interpretation interval is determined as (L3-L2)-DIFF at step 1240. At step 1250, it is determined if the next N packets are correctly decompressed. If they are, the value of DIFF is reset to zero in step 1260. If the next N packets are not correctly decompressed, the packet is discarded and the process exits local repair in step 1270. FIG. 13 illustrates an apparatus corresponding to the method of FIG. 12. Blocks 1300, 1310, 1320, 1330, 1340, 1350 and 1360 in FIG. 13 correspond to 1200, 1210, 1220, 1230, 1240, 1250 and 1260, respectively in FIG. 12.

The various illustrative logical blocks, modules, and circuits described in connection with the embodiments disclosed herein may be implemented or performed with a general purpose processor, a digital signal processor (DSP), an ASIC, a field programmable gate array (FPGA), or other programmable logic device, discrete gate or transistor logic, discrete hardware components, or any combination thereof designed to perform the functions described herein. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in an access terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The previous description of the disclosed embodiments is provided to enable any person skilled in the art to make or use the present application. Various modifications to these embodiments will be readily apparent to those skilled in the art, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

The invention claimed is:

1. A method for decompressing a packet header using a processor, the method comprising:
   determining if decompression of a current packet header failed;
   determining a difference between a link layer sequence number (LL SN) of a previous correctly decompressed packet and a link layer sequence number (LL SN) of the current packet to provide repair information used for header decompression, if header decompression failed;
   adding the difference to the LL SN of the current packet to generate a new reference sequence number, if the difference is greater than or equal to $(2^k)-p$, where k is a number of LL SN bits in the current packet, and p is a shift in an interpretation interval; and
   decompressing the header of the current packet by the processor using the new reference sequence number as the repair information.

2. The method of claim 1, further comprising updating context information used for decompression and delivering the current packet to an upper layer.

3. The method of claim 1, further comprising receiving the previous packet and the current packet over a wireless link.

4. The method of claim 1, wherein the header comprises information related to at least one of Internet Protocol (IP), Real-time Transport Protocol (RTP), User Datagram Protocol (UDP), and Transmission Control Protocol (TCP).

5. The method of claim 1, further comprising determining whether sequence number wraparound occurred.

6. The method of claim 5, wherein determining whether sequence number wraparound occurred comprises:
   determining if the difference is greater than or equal to $2*(L+1)$, where L is a length of half of an interpretation interval used for decompression;
   if the difference is determined to be greater than or equal to $2*(L+1)$, determining if the difference is greater than or equal to 2 (k+1);
   if the difference is determined to be greater than or equal to 2 (k+1), then decompressing the header of the current packet a plurality of times using a plurality of interpretation intervals; and
   if decompressing the header is successful in only one of the interpretation intervals, passing the current packet to an upper layer.

7. The method of claim 6, wherein the interpretation intervals comprise [L+1, 2*(L+1)−1], [2*(L+1), 3*(L+1)−2], . . . , [k*(L+1), (k+1)*(L+1)−(k)], where INTERVAL_LLSN is defined as $k*(L+1) \leq$ INTERVAL_LLSN $\leq k+1)*(L+1)-(k)$.

8. The method of claim 7, further comprising:
   if the difference is determined to be less than 2 (k+1), then determining the wraparound based on information given by a link layer sequence number and least significant bits (LSBs) of a real-time transport protocol (RTP) sequence number in the header.

9. The method of claim 7, further comprising:
   if the difference is determined to be less than $2*(L+1)$, then determining if the difference is less than or equal to L;
   if the difference is less than or equal to L, then performing local repair of decompression context information.

10. The method of claim 7, further comprising:
    determining if least significant bits (LSBs) of a real-time transport protocol (RTP) sequence number (SN) in a header is in the range of [INTERVAL_LLSN/2, L];
    if least significant bits (LSBs) of the radio transport protocol (RTP) sequence number in the header is in the range of [INTERVAL$_{LLSN}$/2, L], then performing local repair of decompression context information;
    if least significant bits (LSBs) of the real-time transport protocol (RTP) sequence number in the header is not in the range of [INTERVAL_LLSN/2, L], then repairing the wraparound based on information given by a link layer sequence number and least significant bits (LSBs) of a real-time transport protocol (RTP) sequence number in the header.

11. An apparatus configured to decompress a packet header, the apparatus comprising:
    means for determining whether decompression of a current packet header failed;
    means for determining a difference between a link layer sequence number (LL SN) of a previous packet and a link layer sequence number (LL SN) of the current packet to provide repair information used for header decompression, if header decompression failed;
    means for adding the difference to the LL SN of the current packet to generate a new reference sequence number, if the difference is greater than or equal to $(2^k)-p$, where k is a number of LL SN bits in the current packet, and p is a shift in an interpretation interval; and
    a decompressor configured to decompress the header of the current packet with the new reference sequence number as the repair information.

12. The apparatus of claim 11, wherein the decompressor is further configured to update context information used for decompression and deliver the current packet to an upper layer.

13. The apparatus of claim 11, further comprising a transceiver to receive the previous packet and the current packet over a wireless link.

14. The apparatus of claim 11, wherein the header comprises information related to at least one of internet protocol (IP), real-time transport protocol (RTP), user datagram protocol (UDP), and transmission control protocol (TCP).

15. The apparatus of claim 11, wherein the decompressor further comprises: means for determining if sequence number wraparound occurred.

16. The apparatus of claim 15, wherein the means for determining if sequence number wraparound occurred further comprises:
    means for determining if the difference is greater than or equal to $2*(L+1)$, where L is a length of half of an interpretation interval used for decompression;
    means for determining if the difference is greater than or equal to 2 (k+1), if the difference is determined to be greater than or equal to $2*(L+1)$;
    means for decompressing the header of the current packet a plurality of times using a plurality of interpretation intervals, if the difference is determined to be greater than or equal to 2 (k+1); and means for passing the current packet to an upper layer if decompressing the header is successful in only one of the interpretation intervals.

17. The apparatus of claim 16, wherein the interpretation intervals comprise [L+1, 2*(L+1)−1], [2*(L+1), 3*(L+1)−2], . . . , [k*(L+1), (k+1)*(L+1)−(k)], where INTERVAL_LLSN is defined as k*(L+1)≦INTERVAL_LLSN≦k+1)*(L+1)−(k).

18. The apparatus of claim 16, wherein the decompressor further comprises:
means for repairing the wraparound based on information given by a link layer sequence number (LL SN) and least significant bits (LSBs) of a real-time transport protocol (RTP) sequence number in the header if the difference is determined to be less than 2 (k+1).

19. The apparatus of claim 16, wherein the decompressor further comprises:
means for determining if the difference is less than or equal to L, if the difference is determined to be less than 2*(L+1); and
means for performing local repair of decompression context information, if the difference is less than or equal to L.

20. The apparatus of claim 16, wherein the decompressor further comprises:
means for determining if least significant bits (LSBs) of a real-time transport protocol (RTP) sequence number in the header is in the range of [INTERVAL_LLSN/2, L];
means for performing local repair of decompression context information, if least significant bits (LSBs) of the radio transport protocol (RTP) sequence number in the header is in the range of [INTERVAL_LLSN/2, L]; and
means for repairing the wraparound based on information given by a link layer sequence number and least significant bits (LSBs) of a real-time transport protocol (RTP) sequence number in the header, if least significant bits (LSBs) of the real-time transport protocol (RTP) sequence number in the header is not in the range of [INTERVAL_LLSN/2, L].

21. An apparatus configured to decompress a packet header, the apparatus comprising:
means for determining whether decompression of a current packet header failed;
means for determining a difference between a link layer sequence number (LL SN) of a previous packet and a link layer sequence number (LL SN) of the current packet to provide repair information used for header decompression if header decompression failed;
means for adding the difference to the LL SN of the current packet to generate a new reference sequence number, if the difference is greater than or equal to (2^k) −p, where k is a number of LL SN bits in the current packet, and p is a shift in an interpretation interval; and
means for decompressing the header of the current packet with the new reference sequence number as the repair information.

22. A method for determining an interpretation interval using a processor, comprising:
determining a difference between a link layer sequence number (LL SN) of a current received packet and a link layer sequence number (LL SN) of a last correctly decompressed packet; and
determining, by the processor, a ratio of the difference in link layer sequence number (LL SN) and a number of bits representing the interpretation interval, wherein the ratio represents an interpretation interval the current packet lies in.

23. A method for determining an interpretation interval using a processor, comprising:
determining a first difference between a real-time transport protocol sequence number (RTP SN) of a first decompressed packet and a real-time transport protocol sequence number (RTP SN) for a second decompressed packet;
determining a second difference between a link layer sequence number (LL SN) for the first decompressed packet and a link layer sequence number (LL SN) for the second decompressed packet;
determining if a third difference between the first and second differences is greater than a threshold;
storing the third difference if the third difference is greater than the threshold;
determining if a next decompressed packet fails a cyclic redundancy check (CRC); and
calculating, by the processor, an interpretation interval for decompression of the next packet based on the third difference if a local repair mode is invoked.

24. The method of claim 23, further comprising:
determining if N packets are correctly decompressed subsequent to decompression of the next packet; and if the N packets are correctly decompressed, resetting to zero, the value of the stored third difference.

25. An apparatus for determining an interpretation interval comprising:
means for determining a first difference between a real-time transport protocol sequence number (RTP SN) of a first decompressed packet and a real-time transport protocol sequence number (RTP SN) for a second decompressed packet;
means for determining a second difference between a link layer sequence number (LL SN) for the first decompressed packet and a link layer sequence number (LL SN) for the second decompressed packet;
means for determining if a third difference between the first and second differences is greater than a threshold;
means for storing the third difference if the third difference is greater than the threshold;
means for determining if a next decompressed packet fails a cyclic redundancy check (CRC); and
means for calculating an interpretation interval for decompression of the next packet based on the third difference if a local repair mode is invoked.

26. A non-transitory computer readable storage medium comprising:
code for causing a computer to determine if decompression of a current packet header failed;
code for causing a computer to determine a difference between a link layer sequence number (LL SN) of a previous correctly decompressed packet and a link layer sequence number (LL SN) of the current packet to provide repair information used for header decompression, if header decompression failed;
code for causing a computer to add the difference to the LL SN of the current packet to generate a new reference sequence number, if the difference is greater than or equal to (2^k)−p, where k is a number of LL SN bits in the current packet, and p is a shift in an interpretation interval; and
code for causing a computer to decompress the header of the current packet using the new reference sequence number as the repair information.

27. A non-transitory computer readable storage medium comprising:

code for causing a computer to determine a first difference between a real-time transport protocol sequence number (RTP SN) of a first decompressed packet and a real-time transport protocol sequence number (RTP SN) for a second decompressed packet;

code for causing a computer to determine a second difference between a link layer sequence number (LL SN) for the first decompressed packet and a link layer sequence number LL SN) for the second decompressed packet;

code for causing a computer to determine if a third difference between the first and second differences is greater than a threshold;

code for causing a computer to store the third difference if the third difference is greater than the threshold;

code for causing a computer to determine if a next decompressed packet fails a cyclic redundancy check (CRC); and code for causing a computer to calculate an interpretation interval for decompression of the next packet based on the third difference if a local repair mode is invoked.

* * * * *